United States Patent
Martin

[11] 3,808,417
[45] Apr. 30, 1974

[54] LAMP SELF-LEVELLING SYSTEM

[76] Inventor: Frederick Raymond Patrick Martin, 68 Hope Pk., Bromley, England

[22] Filed: Apr. 13, 1972

[21] Appl. No.: 243,737

[30] Foreign Application Priority Data
Apr. 16, 1971   Great Britain...................... 9701/71

[52] U.S. Cl............................. 240/7.1 LJ, 240/62 R
[51] Int. Cl............................ B60q 1/00, B60q 3/00
[58] Field of Search....................... 240/7.1 LJ, 62 R

[56] References Cited
UNITED STATES PATENTS
2,105,866   1/1938   Sheaffer........................ 240/62 R X
3,336,470   8/1967   Sombardier ................... 240/7.1 LJ FOREIGN PATENTS OR APPLICATIONS
2,032,588   1/1971   Germany ........................ 240/7.1 LJ
  753,992   3/1967   Canada............................ 240/7.1 LJ Primary Examiner—Samuel S. Matthews
Assistant Examiner—Richard A. Wintercorn
Attorney, Agent, or Firm—Fleit, Gipple & Jacobson

[57] ABSTRACT

A vehicle headlamp self-levelling system in which a double-acting resilient device is included to transmit a single signal to the lamps and to absorb any harsh transient signal component by resilient deformation. The system also includes a damped sleeve assembly to transmit the single signal. The invention may independently include a front signal generating mechanism in the form of an arm attached to the anti-roll bar and pivotally carrying a lever to which the lamps and the rear signal generating mechanism are attached. Furthermore the rear signal generating mechanism may include a pivotal rod engaged by the rear of the vehicle for pivoting movement during deflection of the vehicle rear suspension.

5 Claims, 6 Drawing Figures

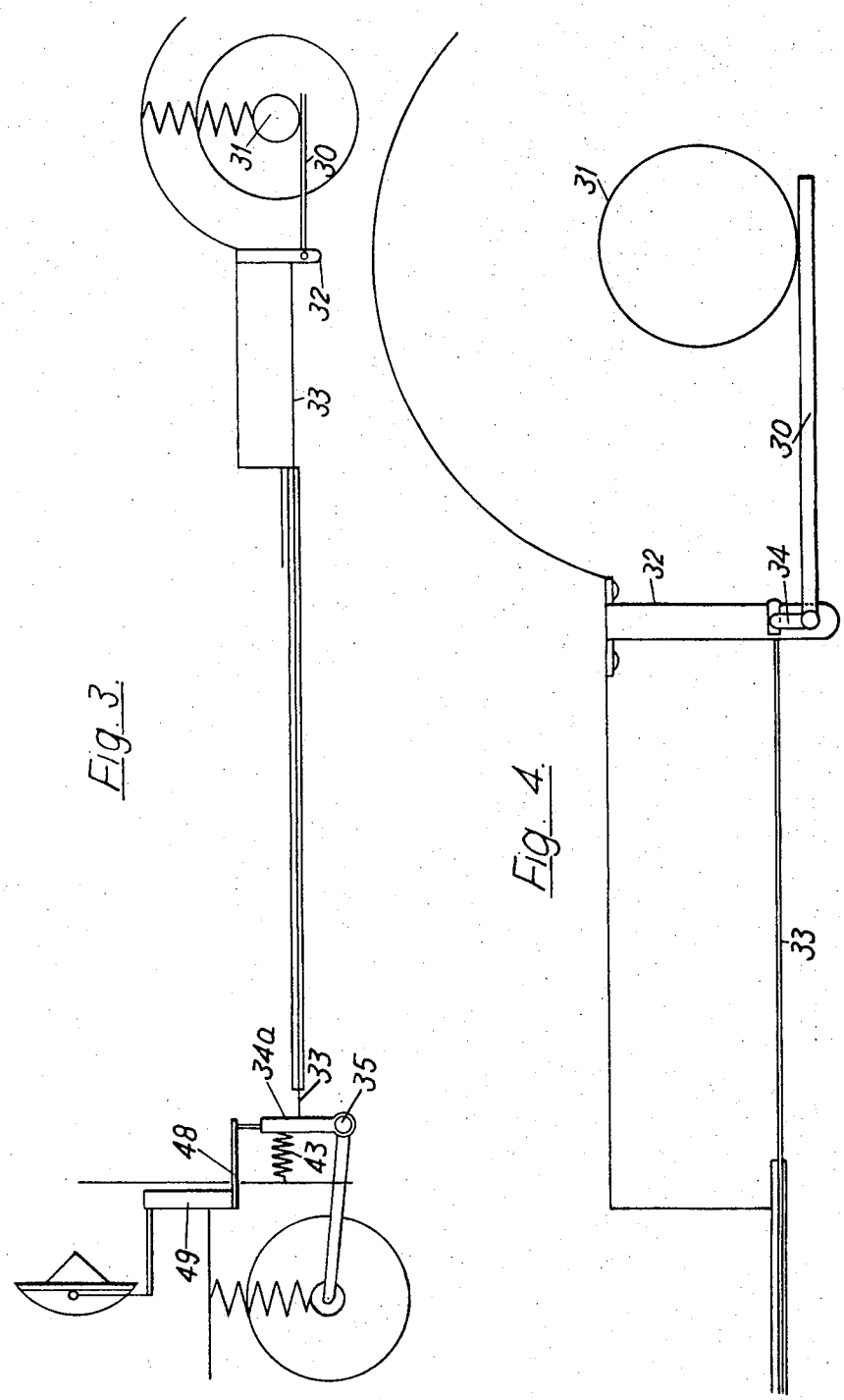

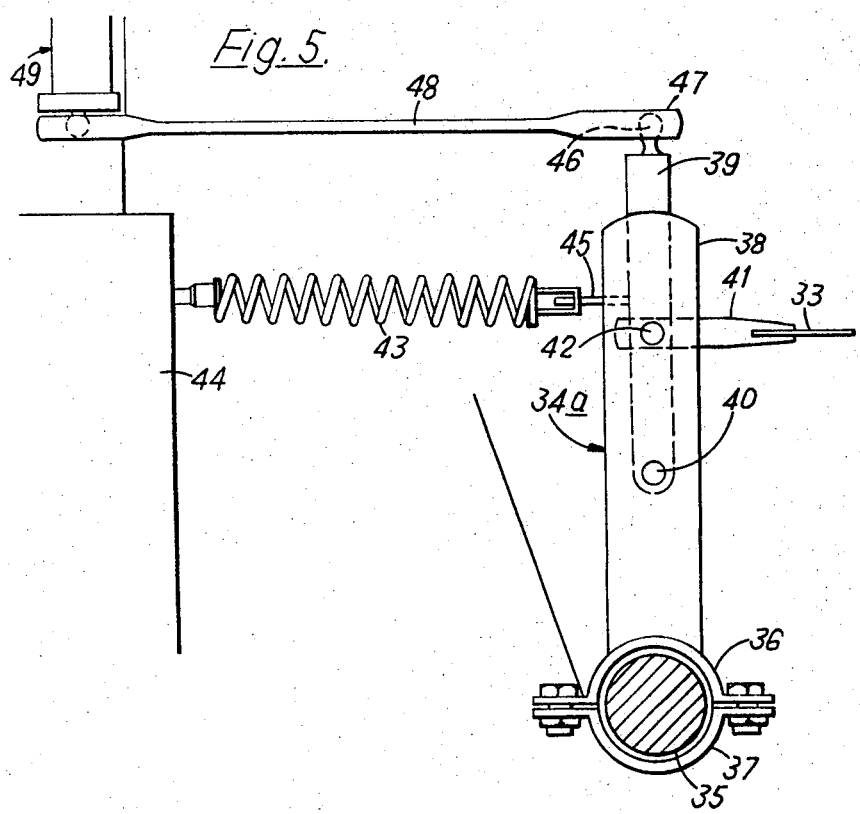
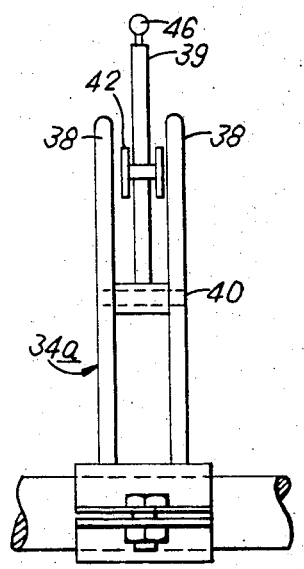

LAMP SELF-LEVELLING SYSTEM

The present invention relates to an improved form of lamp self-levelling system and has particular application to the levelling of a lamp on a road vehicle in response to pitching of the vehicle during motion along an uneven road or during braking and acceleration.

According to the present invention there is provided a vehicle lamp self-levelling system comprising at least one pivotally mounted lamp, means for generating a single signal in response to positioning of the vehicle body relative to the ground wheels of the vehicle, and a double-acting resilient device arranged to transmit the single signal to each lamp.

According to a second aspect of the present invention we provide a vehicle lamp self-levelling system comprising a front vehicle body angle signal generating mechanism, a rear vehicle body angle signal generating mechanism, a signal mixing mechanism for combining the front and rear signals to provide a single output signal and a linkage for transmitting the single output signal to at least one pivotally mounted lamp of the vehicle. The front body angle signal generating mechanism comprises a bifurcated arm fixedly attached to the front anti-roll bar of the vehicle to be pivoted during vertical movement of the vehicle body relative to the front ground wheels, and the signal mixing mechanism comprises a straight lever disposed between laterally spaced portions of the bifurcated arm pivotally carried by the arm at a first location and pivotally attached to the linkage at a second location. The rear vehicle body angle signal generating mechanism communicates with a third location on the lever whereby simultaneous vertical movement of the front and rear of the vehicle body in the same direction relative to the respective pair of ground wheels will cause the lever to undergo displacements such that the second location will remain substantially stationary with respect to the vehicle body.

According to a third aspect of the present invention there is provided a vehicle lamp self-levelling system comprising a rear vehicle body angle signal generating mechanism, a front vehicle body angle signal generating mechanism, a signal mixing mechanism for mixing the front and rear signals to provide a single output signal, and a linkage connecting the mixing mechanism to pivotally mounted headlamps, said rear vehicle body angle signal generating mechanism comprising a rod pivotally attached to the vehicle body and arranged to engage the rear axle of the vehicle to be pivoted during vertical movement of the rear axle relative to the vehicle body, the rod being connected to a linkage communicating the rod to the signal mixing mechanism.

According to a fourth aspect of the present invention we provide a vehicle including any of the above self-levelling systems.

According to a fifth aspect of the present invention we provide a sleeve assembly for use in a vehicle lamp self-levelling system for transferring a mechanical displacement signal between two vertically spaced levels on the vehicle, such sleeve assembly comprising a sleeve freely rotatably mounted around an inner core with a radial clearance between the sleeve and core such that the space between the core and the sleeve can be filled with a damping lubricant, the sleeve being adapted at either end to be connected to respective ones of vertically spaced links of a lamp self-levelling system, and means being provided for fixedly securing the core with respect to a vehicle body.

In order that the present invention may more readily be understood the following description is given, merely by way of example, reference being made to the accompanying drawings in which:

FIG. 3 is a side elevational view showing generally a second embodiment of self-levelling system;

FIG. 4 illustrates in detail the rear body angle signal generating mechanism of the system of FIG. 3;

FIG. 5 shows in detail the front body angle signal generating mechanism and the mixing unit of the mechanism of FIG. 3; and FIG. 6 shows a rear elevational view of the mechanism of FIG. 5.

Figure 1:
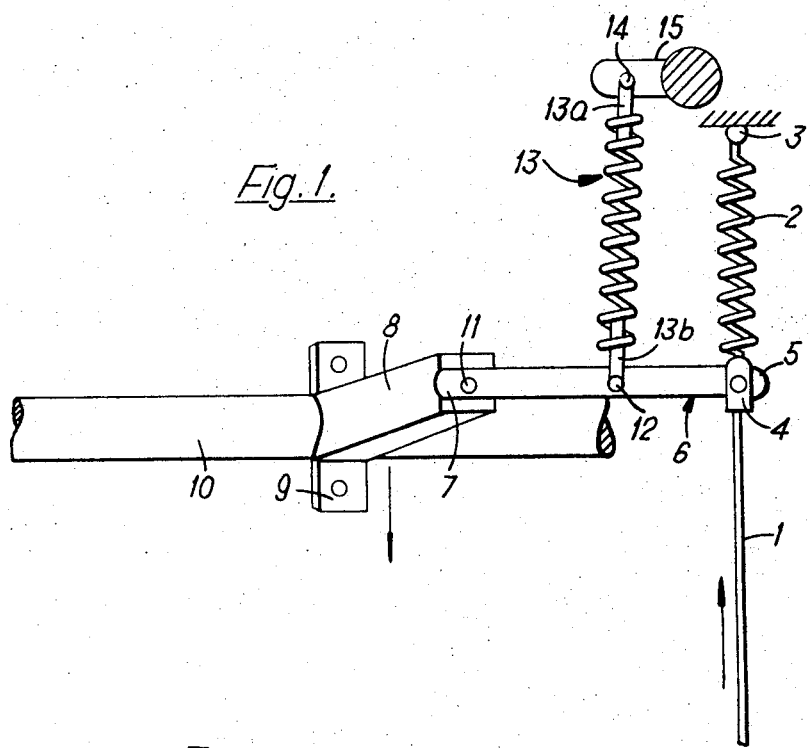
FIG. 1 is a top plan view of a signal mixing mechanism in accordance with the present inventionl.

The top plan view of FIG. 1 shows a cable 1 which extends forwardly from the rear axle of the vehicle and is tensioned by a helical spring 2 secured to the vehicle body at 3. A clevis 4 at the front end of the cable 1 is secured to one end 5 of a signal mixing lever 6 the other end 7 of which is connected to the free end of an arm 8 bracketed at 9 to the conventional anti-roll bar 10 of the vehicle front suspension. The connection between the arm 8 and the end 7 of the lever 6 is in the form of a universal joint 11 which will allow the lever 6 to be connected to the arm 8 without any lost motion but will nevertheless accommodate the arcuate path of motion of the end of the arm 8. At an intermediate location of the lever 6 is a connector 12 for attachment to one end of a double-acting resilient link 13 the other end of which link is connected at 14 to the end of a projecting tab 15 at the lower end of a vertical elevation tube or sleeve assembly described more clearly with reference to FIG. 2. The arrangement of the elevation tube is such that movement of the tab 15 in an counterclockwise direction as viewed in FIG. 1 will result in dipping movement of the various head and/or spot-lamps (not shown) controlled by the self-levelling system.

An outer sheath (not shown) encloses the cable 1 along its length rearwardly of the underside of the vehicle to a point under the rear part of the vehicle body at which point the cable emerges from the sheath and runs directly to the rear axle casing of the vehicle. the connection of the rear end of the cable to the rear axle may take any suitable form but is conveniently in the form of a boss projecting from the rear axle casing and to which the cable can be connected. This arrangement is quite satisfactory once the optimum position of the cable attachment has been determined for each particular type of vehicle; however it may therefore be desirable to provide instead a band which can be clipped onto the vehicle axle and bearing a boss for connection to the cable. This enables the boss position to be adjusted by rotation of the band to different positions to determine the optimum positioning required. It is envisaged that the cable 1 will remain substantially horizontal at least along the latter part of its extent under the underside of the vehicle such that pure vertical movement of the rear axle will cause the least possible rearward pull on the cable 1.

the rear signal is generated by virtue of the characteristic of motor vehicle rear suspensions in that the rear axle tends to move fore and aft during deflection of the rear suspension. For example, some rear axles are supported by leaf springs running longitudinally down either side of the vehicle and supported in rubber bushed fixed links at their front ends and rubber bushed hanging links at their rear end. The configuration of the rear hanging links is such that the link is pivotally secured to the underside of the body in a rubber bush and has its free end pivotally secured to the rear end of the spring, also by means of a rubber bush. The rear axle itself is carried near the center of the spring and clearly, when the axle rises tending to straighten out the initially outwardly concave curve of the spring, the rear hanging bracket of the spring allows the rear of the spring to move rearwardly as it straightens and the center of the spring to which the rear axle is attached will also tend to move rearwardly through a smaller distance. it is this rearward motion which is employed to generate the rear body angle signal in the apparatus illustrated. The presence of the rubber bushes assists in absorbing high frequency low amplitude rear axle movements caused by wheel flutter or "axle tramp."

The front body angle signal is generated as a result of the connection of the arm 8 to the anti-roll bar since, as the front of the vehicle descends, the anti-roll bar will tend to rotate in such a way that the universal joint will move forwardly and exert a corresponding action on the lever 6. As with the rear suspension, the anti-roll bar is conventionally supported from the vehicle body by rubber bushes which will absorb the high frequency small amplitude movement resulting from wheel flutter. Where the vehicle suspension is different from the leaf spring and anti-roll bar configuration described above it will be necessary for some other form of front and/or rear body angle signal generating mechanism to be employed. The precise nature of the various alternative forms of signal generating mechanism which does not form part of this invention and which may readily occur to one skilled in the art will not be described in detail in this specification.

As can be seen from FIG. 1, when the front and the rear of the vehicle descend together through substantially equal distances, the arrangement will be such that the universal joint 11 will move forwardly and the clevis 4 rearwardly by substantially equal increments resulting in rotation of the lever 6 about its center connection 12. This will have the result that no signal is transmitted to the resilient link 13 or to the lamps themselves. If, on the other hand, the movements of the front and rear portions of the vehicle are in opposite senses then the signals transmitted via the cable 1 and the arm 8 will be summated by the mixing unit lever 6 and will effect movement of the resilient link 13 either forwardly in compression or rearwardly in tension depending on the senses of the signals involved.

In order to enable dominance of either the front body angle signal or the rear body angle signal to be overcome, the connection 12 to the resilient link 13 is adjustable longitudinally of the lever 6, i.e., either towards or away from the end 5 of the lever 6. Thus if the rear signal is dominant then movement of the connection 12 away from the end 5 will tend to amplify the effects of the front signal.

Figure 2:
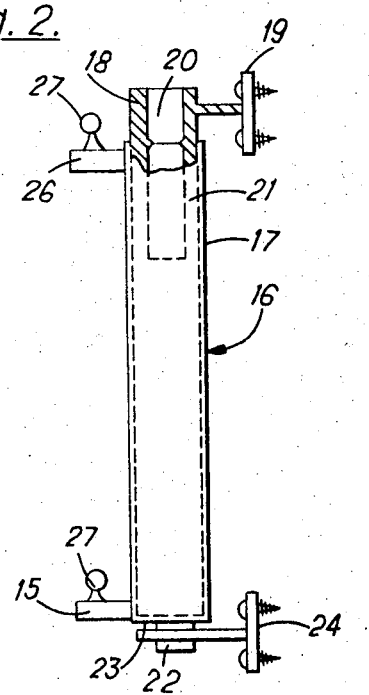
FIG. 2 is a side elevational, partly sectional view of an elevation sleeve assembly constructed in accordance with the present invention.

The elevation sleeve assembly 16 is clearly shown in FIG. 2 as comprising an outer tube or sleeve 17 and an inner core 18 which has at its upper end a bracket 19 arranged to be fixedly secured to the vehicle body. The upper end of the core extends outwardly from the tube 17 and is provided with a blind bore 20 for receiving a damping lubricant fluid such as the lubricant commonly known under the Trade Mark STP. Any other high viscosity lubricant may be employed as a damping fluid. Near the lower end of the blind bore 20 is a small passage 21, preferably having a diameter of the order of 1 mm., for allowing the lubricant within the blind bore 20 to seep gradually outwardly into the thin annular space between the core 18 and the sleeve 17. The core 18 is, in any case, smeared with STP lubricant before assembly into the sleeve 17 and thus the passage 21 serves merely as a replenishing passage for the damping lubricant. The lower end of the elevation sleeve assembly 16 is supported by means of a cylindrical projection 22 extending coaxially and integrally with the sleeve 17 and rigidly secured to an end plate 23 closing the lower end of the sleeve. The cylindrical projection 22 is snugly engaged within a corresponding circular aperture of a lower bracket 24 so as to be freely rotatable with respect to the bracket, thereby permitting the sleeve 17 to rotate with respect to the stationary core 18. By closing the lower end of the sleeve 17 with an end plate 23 it will be ensured that there will be no leakage of STP damping lubricant after prolonged use of the elevation sleeve assembly.

The lower end of the sleeve 17 is provided with the above-mentioned transversely projecting tab 15, and the upper end is likewise provided with a similar transversely projecting tab 26, the two tabs 25 and 26 both including upstanding ball-ended nylon studs 27. The ball-ended stud 27 of the lower tab 15 enables a snap fit connection of the tab 15 to the link 13 and the ball ended stud 27 of the upper tab 26 enables connection of the tab 26 to an arm depending from a cross rod or tube extending transversely across the vehicle and arranged to be directly connected to the one or more tiltable headlamps or spot lamps to be controlled by the system. The particular form of transversely extending cross rod or tube is clearly described in copending my co-pending patent application Ser. No. 51,139 filed June 30, 1970, now abandoned, and continuation application Ser. No. 328,057, filed Jan. 30, 1973.

The studs 27 are each adjustable longitudinally of the associated tabs 15 and 26 in order to vary the damping effect which the film of liquid will generate between the relatively sliding inner and outer surfaces of the sleeve 17 and core 18. By moving both of the tabs outwardly the signals fed to the tab 15 and from the tab 26 will both remain in the same 1:1 ratio, but the moment of each of those signals about the axis of rotation of the tube 17 will have been increased whereas the moment of the viscous drag of the damping lubricant on the inner surface of the sleeve 17 will remain the same. The overall effect will therefore be to provide an effective reduction in the damping effect. Similarly, movement of the two studs 27 inwardly towards the axis of the sleeve 17 will increase the viscous damping effect.

The operation of the damped elevation sleeve assembly will be such that any gentle deflections transmitted from the rear and front body angle signal generating mechanisms 1 and 8 can be transmitted to the lamps since the viscous drag between the inner and outer surfaces of the sleeve 17 and core 18 will permit gentle relative movement therebetween. Such gentle signals will correspond to low frequency wheel vibrations representing changes in the wheel position as a result of vehicle body pitching. However, changes in the wheel position due to wheel flutter or axle tramp will generate a transient signal component which will be superimposed on the body angle component and will have a much higher frequency and reduced amplitude with respect to the main "steady" signal. This high frequency low amplitude component will be damped by the viscous drag of the lubricant between the sleeve and core of the elevation tube asembly, and thus the stud 27 of the tab 26 will execute a movement representing solely the steady state or body angle position signal. The term "steady" used throughout this specification is intended to denote a static or a slowly changing signal which reflects pitching of the vehicle body. This should be in no way interpreted as signifying that the "steady" signal is constant.

The resilient link 13 is shown as including a very strong helical compression spring which is resistant to flexure and which will absorb any harsh transient signal component which tends to compress or extend the spring. The spring has rod portion ends for connection to the tab 15 on the one hand and the arm 6 on the other hand. However, it is envisaged that the system may be sufficiently acutely tunable to allow a substantially rigid member to be substituted for the spring. One such substantially rigid member may comprise two rods similar to the rod portions 13a and 13b illustrated in FIG. 1 and linked together by means of a rubber or plastics material connector piece which will provide the resilient link 13 with resistance to flexure and slight resilience in the compressive or tensile modes.

A further modification of the resilient link 13 may comprise a pair of telescopically interfitting rod and tube members incorporating part-spherical socket portions at their outwardly facing ends and having also annular shoulders near their outwardly facing ends. A helical spring disposed around both the rod member and the tube member before assembly will have its ends attached to the shoulders of the rod and tube members, for example by brazing or soldering, so that the composite link formed may have sufficient resilience to absorb transient signals deadened by the damped elevation tube assembly.

Yet a further modification consists in making the link 13 rigid but instead forming the lower or input tab 15 of the sleeve assembly as a resilient cantilever able to deflect flexurally in response to a harsh transient signal component but to resist and thus transmit a "steady" signal.

The system illustrated in FIGS. 1 and 2 and described above is adjusted by initially adjusting the position of the central connection of the lever 6 to overcome any dominance of either the front or the rear signal and then the two studs 27 are moved outwardly until when the vehicle is driven along even the roughest of roads, just the merest trace of flutter of the lamps in the dipping and raising senses ensues when the vehicle encounters an extreme bump in the road surface. The two studs 27 will then need to be moved through an extremely small increment of distance inwardly towards the axis of the sleeve 17 at which point the self-levelling action of the lamp should be at its most acute and yet not sufficiently delicate to register the harsh transient signal component due to bumps in the road surface.

Where the system is being installed in a particular type of vehicle for the first time, the length of the arm 8 will need to be decided and it will then be possible to use "trial and error" methods to determine the precise positioning of the rear axle casing boss by attaching to the axle a circumferentially adjustable strap carrying the boss, and by rotating the strap until the front and rear signals are of the desired strength.

The system may then be adjusted as described above to eliminate dominance and to adjust the damping effect of the elevation tube assembly 16.

Whereas the previously proposed forms of self-levelling lamp systems employed a maximum signal amplitude of the order of 1 inch, the system illustrated will operate satisfactorily with a maximum amplitude of merely 0.2 inches.

An alternative system according to the present invention is illustrated in FIGS. 3, 4 and 5 and comprises a rear vehicle body angle signal generating mechanism shown in detail in FIG. 4 and a composite front vehicle body angle signal generating mechanism and mixer unit illustrated in FIG. 5.

As can be seen from FIGS. 3 and 4, the rear body angle signal generating mechanism comprises a rod 30 resting against the underside of the rear axle 31 and pivotally attached at its front end to a bracket 32 extending downwardly from the underside of the vehicle floor. The rod 30 is connected to the rear body angle signal transmitting cable 33 by means of a lug 34 extending transversely upwardly from the point of pivotal mounting of the rod 30 of the bracket 32. A tensioning spring 43, to be described later with reference to FIG. 5 but essentially corresponding to the spring 2 of FIG. 1, is employed in order to maintain the signal transmitting cable 33 in a taut condition thereby ensuring that the rod 30 bears upwardly continuously against the rear axle 31.

In this way it is ensured that, as the rear of the vehicle descends, the point of pivotal mounting of the rod 30 on the bracket 32 descends relative to the axle 31 and this enables the above mentioned cable tensioning spring 43 to pull the transmitting cable 33 forwardly thereby lifting the trailing rear end of the rod 30 to maintain it in contact with the axle. Hence in this embodiment forward movement of the cable 33 corresponds to rear body descent signal.

Subsequently, as the rear of the vehicle rises under the restoring influence of the vehicle suspension, the rod 30 will pivot in a clockwise sense thereby pulling the cable 33 rearwardly.

The front body angle signal generating mechanism is illustrated in detail in FIG. 5, and also generally in FIG. 3, as comprising an arm 34 extending upwardly from the vehicle front anti-roll bar 35 and in this instance bolted thereto by means of band clamps 36 and 37. The arm 34 has a bifurcated upper portion forming two ears or side plates 38 between which is disposed a signal mixing mechanism in the form of a lever 39.

The lever 39 is pivoted at a first location, in this case its lower end, on a pin 40 extending between the side plates 38 of the bifurcated end of the arm 34 and has the output signal derived from a second location, in this case a ball fitting 46 at the upper end.

Similarly, a clevis 41 connects the front end of the rear body angle signal transmitting cable 33 to a third location of the lever, in this case a pivot pin 42 disposed near the centre of the lever 39. The lever 39 corresponds in essence to the mixing lever 6 of FIG. 1 but with the principal difference that in this case the output signal is derived from one end of the lever 39 and the rear input signal communicates with the center of the lever while the front input signal communicates with the second end of the lever.

As in the FIG. 1 construction, there will of course be provision for adjusting the position of the pin 42 longitudinally of the lever 39 in order to vary the ratios of the front and rear body angle components of the output signal derived from the upper end of the lever 39.

The tensioning spring 43 referred to above extends between, on the one hand, a nearby component 44 of the vehicle body and, on the other hand, a location 45 near the centre of the lever 39.

The upstanding ball 46 on the upper end of the lever 39 is provided for engagement with a cup fitting 47 at one end of a resilient link 48 analogous to the link 13 of FIG. 1. The front end of the link 48 has a similar ball-and-socket connection with the lower part of a damped elevation tube assembly 49 the upper part of which is connected to a trailing link joining the elevation sleeve assembly to an arm extending transversely, generally downwardly from a cross-tube controlling the two headlights to be levelled.

FIG. 6 shows a rear elevational view of the arm 34 and illustrates the relationship between the two side plates 38 of the arm.

The operation of the embodiment of FIGS. 3 to 6 is as follows. As explained above, downward movement of only the rear of the vehicle body will allow the tension spring 43 to draw the transmitting cable 33 forwardly and this will urge the ball 46 on the mixing lever 39 forwardly. Since it is desired that such descent of the rear of the vehicle should dip the lights, in which case the ball fitting (not shown) at the top of the elevation tube assembly should move rearwardly, the top and bottom arms of the damped elevation tube assembly are in this embodiment arranged to extend along diametrically opposite directions so that as the lower ball fitting moves forwardly the upper ball fitting moves rearwardly, and vice versa.

On the other hand when the front alone of the vehicle body descends, the anti-roll bar 35 will descend relative to the front ground wheels disposed rearwardly of the anti-roll bar and this will result in counterclockwise pivoting movement of the arm 34. The resulting forward movement of the pin 40 will cause the mixing lever 39 to pivot about the clevis pin 42 in a clockwise direction resulting in rearward movement of the ball fitting 46. This will result in forward movement of the top ball fitting of the damped elevation tube assembly and the required raising of the lights.

If both front and rear suspensions undergo similar deformations simultaneously as a result of downward movement of the front and rear parts of the vehicle body through similar distances, the lights are required to remain substantially steady, possibly with only a very slight tendency to rise in order to restore the length of the beam which will shorten as the whole body descends without pitching. The position of the clevis pin 42 should be adjusted to ensure that the ratio of the mixing of the front and rear body angle signals is appropriate to provide this retention of beam length. Clearly such a deformation will result in forward movement of the rear body angle signal transmitting cable and simultaneous forward movement of the pivot pin 40 to counteract one another and maintain the ball fitting 46 at the top end of the mixing lever 39 substantially stationary with relation to the vehicle body.

We claim:

1. A vehicle comprising front and rear ground wheels; a rear axle; a vehicle body; front and rear suspension means supporting said body relative to said ground wheels; means for generating a front vehicle body angle signal in response to the positioning of the front of the vehicle body relative to the front ground wheels; means for generating a rear vehicle body angle signal in response to the positioning of the rear of the vehicle body relative to the rear ground wheels; a signal mixing mechanism for combining the front and rear signals to provide a single output signal; pivotally mounted lamp means; resilient linkage means for transmitting the single output signal to said pivotally mounted lamp means; and an anti-roll bar in the vehicle front suspension means; wherein said front body angle signal generating means comprises an arm fixedly attached to said anti-roll bar to be pivoted during vertical movement of the vehicle body relative to the front ground wheels; and wherein said signal mixing mechanism comprises a straight lever pivotally carried by said arm and having first pivot means connecting said lever to said arm, second pivot means connecting said lever to said linkage, and third pivot means connecting said lever to said rear body angle signal generating means whereby simultaneous vertical movement of the front and rear of the vehicle body in the same direction relative to the respective front and rear ground wheels will cause said lever to undergo displacements such that said second pivot means will remain substantially stationary with respect to the vehicle body.

2. A vehicle according to claim 1, wherein the arm has laterally spaced portions forming a bifurcated end and the lever is disposed between laterally spaced portions.

3. A vehicle according to claim 1, and including a rod mounted at the rear of the vehicle body for pivotal movement during vertical movement of the vehicle rear axle; a cable extending between said third pivot means and said rod and a helical tension spring connected between the vehicle body and said lever.

4. A vehicle having a body, ground wheels, pivotally mounted lamp means, means for generating a signal responsive to positioning of the vehicle body relative to the ground wheels, and signal transmission linkage means connected between said signal generating means and said pivotally mounted lamp means to control dipping and raising movement of said pivotally mounted lamp means, said transmission linkage means including: vertically spaced linkage members; and a sleeve assembly connected to said vertically spaced linkage members, such sleeve assembly comprising (a) an inner core, (b) a sleeve freely rotatably mounted around said inner core, (c) an annular clearance between the sleeve and core; (d) a damping lubricant disposed in said clearance, (e) means at either end of said sleeve for connecting the end of the sleeve to respective ones of said vertically spaced linkage members, and (f) means for fixedly securing said core with respect to a vehicle body.

5. A vehicle according to claim 4 wherein said core includes: a reservoir for damping lubricant, and a passage for allowing feed of damping lubricant from the said reservoir to said clearance between the core and the sleeve.

* * * * *